(12) United States Patent
Debotton

(10) Patent No.: US 12,460,347 B2
(45) Date of Patent: Nov. 4, 2025

(54) FUNCTIONAL FIBROUS MATERIAL COMPRISING MICROBIAL FLAKES, METHODS OF PREPARING AND USES THEREOF

(71) Applicant: SHENKAR ENGINEERING DESIGN ART, Ramat Gan (IL)

(72) Inventor: Nir Debotton, Tel Aviv (IL)

(73) Assignee: SHENKAR ENGINEERING DESIGN ART, Ramat Gan (IL)

( * ) Notice: Subject to any disclaimer, the term of this patent is extended or adjusted under 35 U.S.C. 154(b) by 894 days.

(21) Appl. No.: 17/595,463

(22) PCT Filed: May 17, 2020

(86) PCT No.: PCT/IL2020/050536
§ 371 (c)(1),
(2) Date: Nov. 17, 2021

(87) PCT Pub. No.: WO2020/234867
PCT Pub. Date: Nov. 26, 2020

(65) Prior Publication Data
US 2022/0205167 A1   Jun. 30, 2022

(30) Foreign Application Priority Data
May 20, 2019   (IL) .......................................... 266752

(51) Int. Cl.
| | |
|---|---|
| D06M 16/00 | (2006.01) |
| A61F 13/00 | (2024.01) |
| A61K 35/745 | (2015.01) |
| A61K 35/747 | (2015.01) |
| A61L 15/22 | (2006.01) |
| A61L 15/36 | (2006.01) |
| A61L 15/60 | (2006.01) |
| D06M 23/14 | (2006.01) |
| A61K 35/00 | (2006.01) |

(52) U.S. Cl.
CPC ..... D06M 16/003 (2013.01); A61F 13/00063 (2013.01); A61K 35/745 (2013.01); A61K 35/747 (2013.01); A61L 15/225 (2013.01); A61L 15/36 (2013.01); A61L 15/60 (2013.01); D06M 23/14 (2013.01); *A61K 2035/115* (2013.01)

(58) Field of Classification Search
CPC ............ D06M 16/003; A61F 13/00063; A61K 35/745; A61K 35/747; A61K 9/1652; A61L 15/225; A61L 15/36; A61L 15/60; A61P 17/02
See application file for complete search history.

(56) References Cited

U.S. PATENT DOCUMENTS

| | | | |
|---|---|---|---|
| 5,713,886 A | 2/1998 | Sturino | |
| 6,716,435 B1 | 4/2004 | Farmer et al. | |
| 7,025,974 B2 | 4/2006 | Farmer et al. | |
| 7,507,402 B1 | 3/2009 | Farmer et al. | |
| 7,589,250 B2 | 9/2009 | Drevik et al. | |
| 8,821,854 B2 | 9/2014 | Farmer et al. | |
| 2004/0241151 A1 | 12/2004 | Husmark et al. | |
| 2004/0243076 A1 | 12/2004 | Husmark et al. | |
| 2009/0246184 A1 | 10/2009 | Harel et al. | |
| 2012/0107900 A1 | 5/2012 | Greiner et al. | |
| 2015/0209469 A1* | 7/2015 | McKiernan ............ | A61L 15/42 424/443 |
| 2016/0032271 A1 | 2/2016 | Kuhn et al. | |
| 2016/0354507 A1 | 12/2016 | Aviles et al. | |
| 2018/0280560 A1 | 10/2018 | Rysavka et al. | |

FOREIGN PATENT DOCUMENTS

| | | |
|---|---|---|
| CN | 103114439 A | 5/2013 |
| CN | 203090755 U | 7/2013 |
| CN | 104042558 A | 9/2014 |
| CN | 204863682 U | 12/2015 |
| CN | 105997840 A | 10/2016 |
| CN | 106074620 A | 11/2016 |
| WO | 0061201 A1 | 10/2000 |
| WO | WO 0238097 * | 5/2002 |
| WO | 03038068 A1 | 5/2003 |

(Continued)

OTHER PUBLICATIONS

Goetzendorf-Grabowska, et al., "Antibacterial Air Filter Nonwovens Modified by Poly(Lactide) Microspheres Containing Triclosan", Fibres & Textiles, 2015, pp. 114-119.

(Continued)

*Primary Examiner* — Mina Haghighatian
(74) *Attorney, Agent, or Firm* — GREENBERG TRAURIG, LLP

(57) ABSTRACT

The present disclosure provides functional fibrous material comprising fibers associated with hydrogel containing micro-flakes. The present disclosure also provides a method of forming hydrogel micro-flakes having embedded therein at least one microorganism and a method of preparing functional fibrous material, both methods comprise a step of subjecting a mixture of hydrogel and microbial material to high shear forces to form micro-flakes comprising the hydrogel with at least one microorganism embedded therein. Further provided is a method of treatment of a target comprising contacting the target with the disclosed functional fibrous material as well as the micro-flakes disclosed herein.

19 Claims, 8 Drawing Sheets

(56) References Cited

FOREIGN PATENT DOCUMENTS

Figures 1A, 1B, 1C, 1D, 1E, 1F, 1G, 1H, 1I, 1J, 1K, 1L:
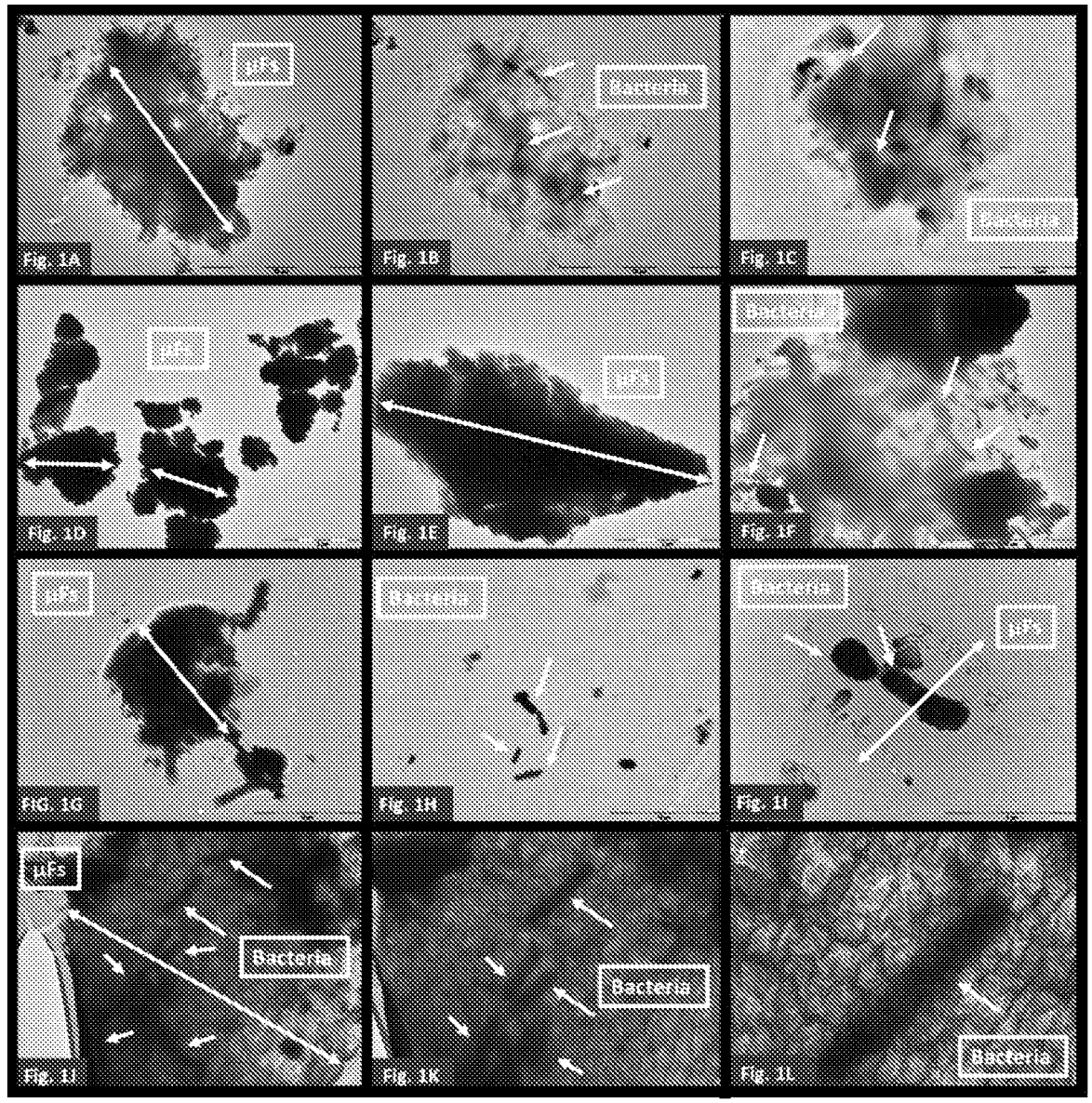

| WO | 03092653 A1 | 11/2003 |
| WO | 2008054268 A1 | 5/2008 |
| WO | 2010088745 A2 | 8/2010 |
| WO | 2011002366 A1 | 1/2011 |
| WO | 2013083800 A1 | 6/2013 |
| WO | 2013171343 A2 | 11/2013 |
| WO | 2015112291 A1 | 7/2015 |
| WO | 2016200716 A1 | 12/2016 |
| WO | 2017019311 A1 | 2/2017 |
| WO | 2017080696 A1 | 5/2017 |
| WO | 2017115125 A1 | 7/2017 |

OTHER PUBLICATIONS

Nierstrasz, et al., "Incorporation of Probiotics on Textile Surface by Sol-Gel Coating", Journal of Industrial Textiles, 2018, pp. 1-12.
Yeung, et al., "Microencapsulation of Probiotics in Hydrogel Particles: Enhancing *Lacococcus lactis* Subsp. Cremoris LM0230 Viability Using Calcium Alginate Beads", Royal Society of Chemistry, Apr. 2016, 8 pages.

\* cited by examiner

FUNCTIONAL FIBROUS MATERIAL COMPRISING MICROBIAL FLAKES, METHODS OF PREPARING AND USES THEREOF

TECHNOLOGICAL FIELD

The present disclosure concerns functional fibrous materials, such as fabrics.

BACKGROUND ART

References considered to be relevant as background to the presently disclosed subject matter are listed below:
U.S. Pat. No. 7,589,250.
US Application Publication No. 2004/0241151. International Patent Application Publication No. WO/10088745;
Goetzendorf-Grabowska, Bogna, et al. "Antibacterial air filter nonwovens modified by poly (lactide) microspheres containing triclosan." *Fibres & Textiles in Eastern Europe* (2015).
Vincent Nierstrasz et al. "Incorporation of probiotics on textile surface by sol-gel coating" *Journal of Industrial Textiles*" (00)1-12, 2018, DOI: 10.1177/ 1528083717750886.
International patent application publication No. WO2010088745
Yeung T W, et al. "Microencapsulation of probiotics in hydrogel particles: enhancing *Lactococcus lactis* subsp. *cremoris* LM0230 viability using calcium alginate beads". Food & function. 2016 Apr. 20; 7(4): 1797-804
U.S. Pat. No. 7,507,402

Acknowledgement of the above references herein is not to be inferred as meaning that these are in any way relevant to the patentability of the presently disclosed subject matter.

BACKGROUND

Probiotics are live microbes which exhibit potential beneficial influence on human health, when given in adequate quantities. Their benefits were demonstrated in many pathological conditions such as: gastrointestinal, acute diarrhea, antibiotic-associated diarrhea, metabolic diseases and even in infectious and inflammatory diseases. Species belonging to the lactic acid producing group of bacteria (LAB), such as *Lactobacillus* and Bifidobacteria are the most common types of bacteria used.

In the past few years, various investigations are emerging in the field of dermatology and the use of probiotics for topical applications onto the skin.

One approach in applying functional material, such as probiotics, onto the skin involves the manufacturing of functional fabrics which are gaining focus in textile research and industry.

For example, US Patent Application Publication No. 2004/0241151 describes a film-shaped polymer matrix including lactic acid producing bacteria that are dissolved when exposed to wet conditions. The film shaped polymer matrix protects the bacteria during transportation and upon use results in transfer of bacterial cells to the skin of a subject.

In addition, U.S. Pat. No. 7,589,250 describes an absorbent article with a liquid permeable surface layer, a liquid impermeable backing layer and an absorbent body positioned between the liquid permeable surface layer and the liquid impermeable backing layer and includes cavities. These cavities may be treated to carry functional substances such as probiotic microorganisms and specifically, strains of lactic acid bacteria taken from the species *Lactobacillus acidophilus, Lactobacillus curvatus, Lactobacillus plantarum* or *Lactococis lactis*.

International Patent Application Publication No. WO/10088745 describes a woven or non-woven textile with consortia of non-pathogenic bacteria. The bacteria is applied to the textile during the manufacturing process in the form of capsules with living non-pathogenic bacteria or spores thereof. The capsules are anchored between the yarns or fibres of the textile and whereby friction forces with the contact surface or vibrations cause the non-pathogenic bacteria to be released from the capsules.

Further, polymeric microspheres containing the antiseptic agent triclosan were successfully introduced into the structure of nonwoven fabrics. These nonwovens obtained excellent antibacterial properties up to 12 months, as air conditioner filters (Goetzendorf-Grabowska et al., 2015).

Yet further, the incorporation of probiotic spores in polyester woven fabric surface using sol-gel dip coating method was investigated and described (Vincent Nierstrasz et al).

International patent application publication No. WO2010088745 describes a woven or non-woven textile featuring capsules with living non-pathogenic bacteria or spores thereof, applied during the manufacturing process of the textile and in such a manner that they are anchored between the yarns or fibres of the textile and whereby friction forces with the contact surface or vibrations cause the non-pathogenic bacteria to be released from the capsules.

Microencapsulation of probiotics in hydrogel particles was also described by Yeung T W, et al. where it is described that the encapsulation improved the viability of the probiotics during aerobic storage, and suggested that these hydrogel beads may have applications for improving the stability and efficacy of probiotics in functional foods. (Yeung T W, et al., 2015).

U.S. Pat. No. 7,507,402 describes compositions including isolated *Bacillus* species, spores or an extracellular product of *B. coagulans*, suitable for topical application, for inhibiting growth of yeast, fungus, bacteria or Herpes simplex virus.

GENERAL DESCRIPTION

The present disclosure is based on the development of a functional fibrous material comprising, in a non-limiting example, a non-woven fabric holding, in a non-covalent manner, hydrogel-based particulate matter having embedded therein beneficial bacteria. It has been shown, as also demonstrated hereinbelow, that the bacteria remain viable and the fibrous material remain functional even after storage and that upon use of the fabric, e.g. by application onto the skin, a beneficial effect is achieved.

Thus, in accordance with a first of its aspects, the present disclosure provides a functional fibrous material comprising fibers associated with hydrogel containing micro-flakes, the hydrogel having embedded therein at least one microorganism, wherein wherein portions of the micro-flakes are entangled with some of said fibers. This entanglement can be viewed by a microscope, such as a scanning electron microscope (SEM) at the magnifications used in the following non-limiting examples.

In accordance with a second of its aspects, the present disclosure provides a method of forming hydrogel microflakes having embedded therein at least one microorganism, the method comprises (a) suspending said at least one microorganism in a solution comprising gel forming material to form a microbial mixture; (b) treating the microbial mixture under conditions to cause formation of a hydrogel from said gel forming material, where said at least one microorganism is integrated within the hydrogel; and (c) subjecting the said hydrogel to high shear forces to form micro-flakes comprising said hydrogel with the at least one microorganism embedded therein.

In accordance with a third of its aspects, the present disclosure provides a method of preparing a functional fibrous material comprising fibers associated with hydrogel containing micro-flasks, the hydrogel having embedded therein at least one microorganism, the method comprises (a) suspending said at least one microorganism in a solution comprising gel forming material to form a microbial mixture; (b) treating the microbial mixture under conditions to cause formation of a hydrogel from said gel forming material, where said at least one microorganism is integrated within the hydrogel; (c) subjecting the said hydrogel to high shear forces to form micro-flakes comprising said hydrogel with the at least one microorganism embedded therein; and (d) associating said micro-flakes with fibers to form said functional fibrous material.

Yet further, the present disclosure provides, in accordance with a fourth aspect, a method of treatment comprising contacting a target to be treated (e.g. skin, solid objects) with a functional fibrous material, the functional fibrous material comprises fibers associated with hydrogel containing micro-flasks, the hydrogel having embedded therein at least one microorganism.

Finally, the present disclosure provides micro-particles (which are not spherical particles) comprising hydrogel in a form of micro-flakes, the hydrogel having embedded therein at least one microorganism.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A-1L provide TEM micrographs of probiotic loaded micro-flakes (μFs) comprising different bacteria strains. FIGS. 1A-1C: *Lacotbacillus plantarum* (LP) bacteria (cross-linked using 2.5 mg/ml $CaCl_2$); FIGS. 1D-1F: LP bacteria (cross-linked using 5 mg/ml $CaCl_2$); FIGS. 1G-1I: CoBiotic™ bacteria mixture (cross-linked using 5 mg/ml $CaCl_2$); FIGS. 1J-1L *Bacillus* coagulants (BC) bacteria (cross-linked using 5 mg/ml $CaCl_2$). A single-headed arrow indicates the area dimensions of the obtained μFs. A double headed arrow depicts the probiotic bacteria cargo within the obtained μFs.

FIG. 2 provides a graph showing the percentage of colony forming units (CFU) of μFs comprising *Bacillus coagulans* with 1.5% trehalose (black curve) and without added trehalose (grey curve). AVE±SE. N>3.

FIGS. 3A-3L provide SEM micrographs of different non-woven fabrics (NWFs) treated with *Bacillus coagulans* (BC)-loaded μFs using impregnation and air-drying: FIGS. 3A-3C: fabric composition of polyethylene terephthalate: viscose (PET:VIS) 50%:50% FIGS. 3D-3F: PET:VIS 80%: 20% FIGS. 3G-3I: fabric composition of polyethylene/polypropylene:cotton (Bicomponent PE/PP:COT) 85%: 15%; and FIGS. 3J-3L: polypropylene fabric.

FIGS. 4A-4B provide SEM micrographs at two different magnifications (×170 FIG. 4A, ×340, FIG. 4B) of the NWF A from Table 4, each exhibiting the "arms" of the micro-flakes being wrapped around the textile's fibers thereby being entrapped within the NWF.

FIGS. 5A-5C provide graphs showing the number of live *Bacillus Coagulans* bacteria per $cm^2$ over time of four NWFs (A-D, See Table 4) treated with probiotic μFs, at 25° C. (FIG. 5A), 40° C. (FIG. 5B) and 60° C. (FIG. 5C).

FIGS. 6A-6B shows human skin viability scores, following pre-treatment with 5% sodium dodecyl sulfate (SDS) solution and incubation over 24 h with NWFs. Bicomponent PE/PP:COT fabric treated with probiotic μFs at concentrations of $10^6$-$10^9$ bacteria/$cm^2$. Non-inflamed skin ("Skin"), placebo treated ("Blank") were used as controls (FIG. 6A) or with two different NWFs (C and D See Table 4) treated with probiotic μFs at concentration of $10^8$ bacteria/$cm^2$. Non-inflamed skin ("Skin"), placebo treated ("Blank") were used as controls. (FIG. 6B). Values in FIGS. 6A and 6B are AVE±SD. N=6. *$p<0.05$.

FIGS. 7A-7B are graphs showing the disintegration of the microbial micro-flakes disclosed herein (four tested samples (N=4)) in water (FIG. 7A) and in phosphate buffer saline (FIG. 7B).

DETAILED DESCRIPTION OF EMBODIMENTS

The present disclosure provides functional fibrous material comprising fibers (that constitutes the non-functional fibrous matter) associated with hydrogel containing micro-flakes, the hydrogel having embedded therein at least one microorganism, as well as methods of forming the hydrogel micro-flakes having embedded therein at least one micro-organism and of introducing these hydrogel micro-flakes into fibers based or containing articles, and to the use of the functional fibrous material, inter alia, in methods of biological treatment, in the following description, examples and embodiments described in relation to the functional fibrous material also apply to the various disclosed methods for preparing or making use of the functional fibrous material.

In the following description, the term "fibrous matter" denotes the matter formed by the fibers, without the hydrogel, and the term "functional fibrous material" denotes the combination of at least the fibers, i.e. the fibrous matter, and the hydrogel micro-flakes holding the microorganism. The functionality of the fibrous material can be defined by any one or combination of: type of microorganism held by the hydrogel, amount of microorganism held by the hydrogel, type of fibers, type/form of fibrous matter, etc. The functionality of the fibrous material can also dictate the use thereof, as further discussed below.

In the context of the present disclosure, the fibrous matter can be composted into any solid object comprising a plurality of fibers coupled together into a fibrous structure.

The fibers of the fibrous matter can be densely coupled resulting in a solid rigid article or they can be made of loosely coupled fibers, resulting in a flexible fibrous matter like fabric where the fibers have some freedom to move relative to each other. The density of the fibers can characterize the fibrous matter, as discussed further below.

In some examples, the fibers in the fibrous matter are coupled together, in accordance with some examples, into a form of a sheet or a fabric. This includes woven as well as non-woven fabric.

In some example, the fabric is a non-woven fabric, i.e. a web structure bonded together by entangling fibers or filaments in an disorganized/unsystemic/patternless manner.

The fibers can be staple fibre (short fibers) and/or long fibers. The fibers are held together to form the fibrous matter by any technique known in the art that is other than weaving or knitting, such techniques may include, without being limited thereto, chemical bonding, mechanical, heat or solvent treatment.

When the fibers are coupled together in the form of a fabric, the fabric can be characterized by the density of the fibers which is also indicative of the thickness of the fabric. In some examples, the density of the fibers is defined by its weight (in grams) per area unit (square metre) of the fabric.

In some examples, the fibrous matter, namely fibers without the hydrogel micro-flakes, comprises at least 0.15 g fibers for each area unit (1 m$^2$) of the fabric.

In some other embodiments, the fabric comprises at least 0.2 g/m$^2$, at times at least 0.3 g/m$^2$, at times at least 0.4 g/m$^2$, at times, at least 0.5 g/m$^2$, at least 0.6 g/m$^2$, at least 0.7 g/m$^2$, at least 0.8 g/m$^2$, at times 0.9 g/m$^2$ or even at times at least or more than 1 g fibers for each area unit (1 m$^2$) of the fabric. In some examples, the fabric is a non-woven fabric having a weight at least 1/m$^2$. In some examples, the fabric is a non-woven fabric having a weight at least 1.5 g/m$^2$, or at least 1.8 g/m$^2$, or equal or above 2 g/m$^2$.

In some examples, the functional fibrous material is structured into a form of filling material within a column, e.g. chromatography column, through which fluids can pass, thereby allowing the fluid to come into contact with the hydrogel embedded in the functional fibrous material and to be treated by the microorganism held thereby.

In some examples, the functional fibrous material is structured into a form of a filter, e.g. to be used in fluid filtration. In some examples, the filter can be used to filter water or an aqueous solution. In some other examples, the filter can be used to filter gas, e.g. air.

The fibrous matter formed by the coupled fibers hold hydrogel containing micro-flakes and together constitute the functional fibrous material. In some embodiments, the holding of the micro-flakes is a non-covalent holding, including mechanical holding, electrostatic holding, or any other manner of non-covalent binding between the micro-flakes and the plurality of fibers.

The hydrogel-containing micro-flakes have sheet like/flat/lamellar shape which is presumed to contribute to the non-covalent binding (entanglement or wrapping around) of the flakes to the fibers. Specifically and without being bound by theory, it is assumed that the holding of the micro-flakes to the fibers (to the fibrous matter) is achieved due to the irregular/amorphous, essentially flat, shape of the flakes, having arm-like, protruding edges that anchor into, or entangle with the fabric's fibers. In this context it is to be understood that the micro-flakes have a shape that is not spherical.

The micro-flakes are essentially similar in size, i.e. have a narrow size distribution. In the context of the present disclosure when referring to the size of the flakes and specifically to their size distribution it is to be understood as meaning that in a population of flakes there is a narrow size distribution (are essentially homogenous in size), i.e. at least 50%, at times, at least 60%, at times at least 70%, at times, at least 80%, at times, at least 85% or even at least 90% of the flakes have a mean diameter or a diameter within the range of 50 μm and 500 μm.

Alternatively or in addition, homogeneity can be defined when in a population of micro-flakes at least 90% of the micro-flakes have a mean diameter or diameter in the range of 30 μm to 700 μm, and no more than 10% of the said population has a mean diameter or diameter below 30 μm or above 700 μm.

In some examples, 90% of the micro-flakes have a mean diameter or diameter in the range of 50 μm to 500 μm, and not more than 10% of the said population has a mean diameter or diameter below 50 μm or above 500 μm.

In some examples, 90% of the micro-flakes have a mean diameter or diameter in the range of 50 μm to 400 μm, and not more than 10% of the said population has a mean diameter or diameter below 50 μm or above 400 μm.

In some examples, homogeneity is defined by a population of micro-flakes having a deviation of no more than 20%, at times no more than 10% from an average diameter within the range of 50 μm to 500 μm.

The size distribution and homogeneity thereof can be determined by laser diffraction particle size analyzer (Mastersizer 3000, Malvern, UK). The laser beam used in this technique crosses through a dispersion system. The laser beam is diffracted in a manner in which large particles scatter light at small angles relative to the laser beam while small particles scatter light at large angles. The angular variation in the intensity of the scattered light is recorded and the size of the particles is calculated using Mie theory of light scattering as a volume equivalent sphere diameter.

In some examples, the micro-flakes are analyzed 5 times in water at 25° C. Mastersizer software version 3.62 was used to analyze the reported D(x) 10, D(x) 50 and D(x) 90, with obscuration of approximately 5% and assuming non-spherical particles.

It is to be noted that the mean size of the micro-flakes can be controlled, e.g. by controlling the shear forces applied during the manufacturing stage, as further discussed below.

The micro-flakes are hydrogel based, and as such comprise at least one water absorbing polymer.

As used herein the term "hydrogel" refers to a polymeric network or polymeric matrix, having an ability to absorb and retain amounts of water. In some examples, the polymeric matrix is capable of absorbing water in an amount that is at least 2 times, at least 4 times, at least 5 times, at least 7 times, and at times at least 10-50 times and even more of the gel forming polymer(s) own weight thereby forming a gel. To facilitate water absorption, the hydrogel comprises at least one water absorbing gel forming polymer.

The hydrogel comprises at least one polymer that forms into a polymeric matrix. According to the present disclosure the polymer forming the polymeric matrix may be fully or partially cross-linked, but also may be one that forms into a matrix without any cross-linking, namely a non-crosslinked hydrogel.

In some examples, the hydrogel comprises a cross linked polymer. In some examples, the cross-linkable polymer is one that can be fully cross linked, and in some other examples only parts of the polymer are cross-linked, i.e. the polymer forms a hydrogel that is a partially crosslinked hydrogel.

The polymer or polymers forming the polymeric matrix of the hydrogel can be synthetic, semi-synthetic or natural. At times, the polymeric matrix comprises a mixture of synthetic and/or semi-synthetic and/or natural polymers, at least one being a gel forming polymer.

An example for a water absorbing non-cross-linked gel forming (synthetic) polymer includes polyethyleneglycol (PEG) forming PEG-based gels, such as the non-limiting example of PEG-poly(lactic-co-glycolic acid) gel (PEG-PLGA gel).

A non-limiting list of synthetic, hydrogel forming polymers, include polyvinyl alcohol, poly(lactic-co-glycolic acid)-polyethylene glycol-poly(lactic-co-glycolic acid) (PLGA-PEG-PLGA), polyacrylic acid, methacrylic acid and methyl methacrylate copolymer, butyl methacrylate, dimethylaminoethyl methacrylate and methyl methacrylate copolymer polymer, poly(propylene fumarate-co-ethylene glycol) (P(PF-co-EG)), and polypeptides.

A non-limiting list of natural polymers that can form into a cross-linked hydrogel include tragacanth, chitosan, hyaluronic acid, alginic acid, carrageenan, agarose, collagen fibrin and gelatin.

In some examples, the hydrogel comprises at least cross-linked alginate. There are different types of alginate that can be used in the context of the present disclosure. For example, and without being limited thereto, the polymeric matrix comprises low viscosity (LV) alginate (molecular weight of the polycarbohydrate –100,000, also used in the non-limiting examples), or very low viscosity (VLV) alginate (molecular weight of the polycarbohydrate –30,000).

In one example, the hydrogel comprises alginate that is cross linked by Ca ions to from Ca-alginate cross-linked hydrogel.

Without being bound by theory, the Ca-cross-linked alginate hydrogel is created by means of coordination bonding between Ca ions and neighboring sodium alginate chains in a structure referred to as "egg-box" model. The Ca ions required for gelation is extremely low, as compared to other hydrogels such as gelatin. Since the $pK_a$ of the residual carboxylic groups on the alginate chains is between ~3 to 5, therefore the hydrogel collapses at pH lower than approximately 3.5. Sodium alginate is a copolymer comprised of blocks of (1-4)-linked β-D-mannuronate (M) and blocks of C-5 epimer α-L-guluronate (G). The M/G ratio effects the gelling properties of the hydrogels.

The amount of hydrogel within the functional fibrous material can be defined. In some examples, the weight percent of the micro-flakes as determined when in dry form, out of the weight of the fibrous matter (i.e. the fibers only) is at least 0.5% w/w, at least 1% w/w, at least 2% w/w, at least 5% w/w or even more.

As noted above, the hydrogel micro-flakes of the functional fibrous material carry at least one microorganism that is embedded within the hydrogel matrix. As appreciated by those versed in the art, hydrogels are characterized by pores and at least a portion of the microorganism are incorporated or entrapped within the pores.

In the context of the present disclosure the at least one microorganism comprises any one or combination of a bacterium, yeast, archaea, fungi and algae.

In some examples, the at least one microorganism comprises at least one bacterium.

In some examples, the at least one microorganism comprises at least one live microorganism.

In some examples, the at least one microorganism comprises at least one live bacterium.

In some examples, the at least one microorganism comprises a consortium of bacteria (microbial consortium), at least some of the bacteria are live bacteria.

In some examples, the at least one microorganism comprises probiotics or is a probiotics.

When the microorganisms comprise a probiotic, this may include, without being limited thereto microorganisms selected from the genera including *Lactobacillus, Bifidobacterium, Bacillus, Escherichia, Streptococcus, Propionibacterium* and *Saccharomyces* and any combination of same. When the microorganism comprises a bacterium, this may include, without being limited thereto, bacterium selected from the genera including *Lactobacillus, Bifidobacterium, Bacillus, Escherichia, Streptococcus, Propionibacterium* and any combination of same.

Non-limiting examples of bacterium from the genera *Lactobacillus* include *Lacotbacillus plantarum, Lactobacillus rhamnosus, Lactobacillus acidophilus, Lactobacillus casei, Lactobacillus sakei, Lactobacillus Lactis, Lactobacillus Paracasei, Lactobacillus reuteri*, and *Lactobacillus gasserii*.

Non-limiting examples of bacterium from the genera *Bifidobacterium* include *Bifidobacterium bifidum* and *Bifidobacterium longum, Bifidobacterium Breve, Bifidobacterium Lactis*, and *Bifidobacterium infantis*

Non-limiting examples of bacterium from the genera *Bacillus* include *Bacillus coagulans, Bacillus subtilis, Bacillus indicus, Bacillus clausii, Bacillus licheniformis* and *Bacillus cereus.*

Non-limiting examples of bacterium from the genera *Escherichia* include *Escherichia coli* strain Nissle 1917

Non-limiting examples of bacterium from the genera *Streptococcus* include *Streptococcus thermophiles.*

Non-limiting examples of bacterium from the genera *Propionibacterium* include *Propionibacterium acidipropionici, Propionibacterium freudenreichii* and *Propionibacterium jensenii*

Any combination of the above bacteria constitutes an embodiment of the present disclosure.

When the microorganism comprises fungi, e.g. yeast, this may include, without being limited thereto, *Saccharomyces boulardii*, (known for treatment of diarrhoea, irritable bowel diseases and acute gastroenteritis).

When the microorganism comprises a archaea, this may include, without being limited thereto, *Thaumarchaeota* typically present in the human skin microbiota.

When the microorganism comprises algae, this may include, without being limited thereto, Snow Algae, *Chlorella* sp., *Nannochloropsis* sp., *Haematococcus* sp. (e.g. astaxanthin) and *Scenedesmus* sp. Such algae are known to be used in skin products e.g. as moisturizing, antioxidant and anti-wrinkle agents.

The amount of microorganism held by the hydrogel micro-flakes may vary depending, inter alia, on the type of gel forming polymer used, the type of fibers forming the functional fibrous material, the density of the fibers, and other parameters. Yet, it has been found that the hydrogels in the form of micro-flakes as disclosed herein are capable of holding at least $10^2$ CFU/cm$^2$ fibers, at times at least $10^3$ CFU/cm$^2$ fibers, at times at least $10^4$ CFU/cm$^2$ fibers, and at times even $10^5$ CFU/cm$^2$ fibers.

In some examples, the amount of microorganism held by the hydrogel micro-flakes amounts to between $10^5$ and $10^{10}$ CFU/cm$^2$.

A surprising finding was that a statistically significant amount of the microorganisms remains viable (alive) after storage of the functional fibrous material disclosed herein. In this context, a statistically significant amount denotes at least $10^2$ CFU/cm$^2$ fibers area.

Viability was determined by measuring enzymatic metabolism after storage at different temperatures. Viability is one parameter for determining stability of the functional fibrous material and based on the experimental data it could be easily concluded that the functional fibrous material is stable after storage at either 25° or 40° C. for a period of at least 5, 6, 7, 8, 10, 12, 15, 17, 19 and even 23 weeks, if the functional fibrous material includes at least $10^1$ CFU/cm$^2$ fibers area. In this connection, reference is made to FIGS.

4A and 4B showing that all the fabrics were stable for at least 23 weeks, and FIG. 4C showing stability of at least 14 weeks. Further, in all exemplified fabrics the viability remained in the same magnitude of $10^8$ CFU/cm$^2$. These are unexpected results since in microbiology the reduction is measured in the logarithmic scale. That means that a reduction from $10^8$ to $10^5$ would indicate instability.

The hydrogel micro-flakes can contain other substances that can be beneficial for the functionality of the functional fibrous material. Such other substances may include, for example, sugars based molecules, e.g. sugars, sugar alcohols. Without being bound by theory, the sugar may act as a nutrient for the bacteria, and/or as a protectant of the micro-flakes upon drying. In terms of cosmetic applications the sugar may elicit moisturizing effect upon contact with the skin.

When the hydrogel contains sugar(s), this may include any one of, or combination of sucrose, glucose, fructose and trehalose.

When the hydrogel contains sugar alcohol(s), this may include any one of, or combination of mannitol, sorbitol, xylitol, maltitol, lactitol and isomalt.

In some examples, the hydrogel contains a combination of sugars and/or sugar alcohols.

In some examples, the hydrogel contains at least trehalose.

The amount of the sugar based molecule or molecules added may vary depending, inter alia, on the type of gel forming polymer used, the type of microorganisms included in the hydrogel, presence of other substances etc.

In some examples, the amount of sugar based molecules added to the hydrogel is between 0.1% w/w and 10% w/w, at times, between 0.5% w/w and 5% w/w, at times about 1.5% w/w (about denoting fluctuations of 10% from the recited %) based on the total dry weight of the gel forming polymer.

In some examples, the hydrogel also comprises cryoprotectant agents, as known in the art.

The amount of hydrogel micro-flakes in the functional fibrous material may vary. Yet, in some examples, the functional fibrous material comprises a weight percent of the micro-flakes with respect to fibers (the weight of the fibrous matter), is at least 0.5% w/w, this being determined when the micro-flakes are in dry form.

In some examples, the weight percent of the micro-flakes with respect to the weight of fibers (the weight of the fibrous matter) is at least 0.6% w/w or at least 1.8% w/w or at times even at least 1.0% w/w.

The functional fibrous material disclosed herein can have various applications. In some examples, the functionality of the fibrous material defines the possible use thereof.

In some examples, the functionality is defined by the type of microorganisms in the functional fibrous material.

In some examples, the microorganisms are of a type suitable for dermatological uses. These may include, for example, probiotics, and in accordance with another example, anti-microbial microorganisms.

It has been found that the microorganism embedded in the hydrogel containing micro-flakes can be released from the flakes and that this release is triggered or is enhanced in the presence of electrolytes. Thus, it was realized that the electrolytes present on the skin can act as triggers for the smart release of the microorganism once the micro-flakes or the functional fibrous material is brought into contact with the subject's skin (and thereby with cutaneous secreted electrolytes, e.g. due to perspiration). This finding was of particular interest as the same fibrous material had no or significant less release of the microorganism, when it was brought into contact with distilled water. In this connection, it is noted that 'smart release' denotes a release that is dependent on the environment. Similar to 'smart materials' (a term known in the art) the micro-flakes disclosed herein respond to changes in their environment (sensor-actuator probiotic activity). That means that smart release would be the release of the bacteria upon change in the electrolyte environment (Sensor—electrolyte; actuator—release).

When used for dermatological purposes, the fibrous matter should have a form suitable for contacting the hydrogel micro-flakes to the skin surface.

In some examples, the functional fibrous material for use in dermatology is in a form of a fabric. According to this example, the hydrogels can be brought into contact with the skin by, for example, rubbing/scrubbing the fabric over the skin, pressing the fabric onto the skin and/or using the fabric as a dermatological mask.

In some examples, the functional fibrous material for use in dermatology is in a form of a cube, such as a scrub cube for scrubbing the face and release of fibers and hydrogel matter onto the skin.

The use in dermatology may be for cosmetic purposes as well as for medical purposes and this can be defined by the physician, based, inter alia, on the type of microorganism within the functional fibrous material.

In some examples, the functional fibrous material is for use in treatment of acne.

In some examples, the functional fibrous material is for use in treatment of seborrhea.

In some examples, the functional fibrous material is for use in treatment of atopic dermatitis.

In some examples, the functional fibrous material is for use in treatment of ammonia dermatitis.

In some examples, the functional fibrous material is for use in treatment of psoriasis.

In some examples, the functional fibrous material is for use in treatment of rosacea.

In some examples, the functional fibrous material is for use in wound healing or wound care.

In some examples, the functional fibrous material is for use in treatment of burns.

In some examples, the functional fibrous material is for use in treatment of infection. The infection is one that is caused by any pathogen. In some examples, the infection is a bacterial infection, yeast or viral infection, preferably bacterial infection.

In some examples, the functional fibrous material is formulated or suitable for cosmetic applications, for example, to improve hydration, for cleansing, for conditioning, for skin regeneration, for anti-wrinkles treatment, for anti-aging treatment, for exfoliation and for protecting the skin against UV-induced damage.

The hydrogel micro-flakes with the at least one microorganism can be obtained by first suspending the microorganism(s) in a solution comprising the gel forming material/polymer to form a microbial mixture comprising the at least one microorganism and the gel forming material. Then, the microbial mixture is treated under conditions that cause the formation of hydrogel with the at least one microorganism integrated/embedded within the gel.

It is noted that if additional material is to be included in the hydrogel, such as the sugar described above, this is typically added after the formation of the hydrogel.

In some examples, the condition causing formation of hydrogel comprises adding to the microbial mixture a cross linking agent. The cross linking agent is typically selected based on the type of gel forming material used.

In some examples, the hydrogel comprises alginate that is cross linked by Ca ions to from Ca-alginate cross-linked hydrogel.

In some further examples, the hydrogel comprises a Hyaluronate Hyaluronsan HA-AM hydrogel. The Hyaluronate Hyaluronsan HA-AM hydrogel (MW molecular weight: 600,000 to 1,200,000) is formed from hyaluronic acid an calcium ions.

In some other examples, the matrix comprises chitosan cross-linked with oxalic acid or tripolyphosphate to form a positively charged hydrogel.

In yet some further examples, the hydrogel comprises PLGA-PEG-PLGA triblock copolymer [Steinman, N. Y., Haim-Zada, M., Goldstein, I. A., Goldberg, A. H., Haber, T., Berlin, J. M. and Domb, A. J. (2019), Effect of PLGA block molecular weight on gelling temperature of PLGA-PEG-PLGA thermoresponsive copolymers. J. Polym. Sci. Part A: Polym. Chem., 57: 35-39. doi:10.1002/pola.29275].

The formation of the hydrogel in the presence of the microorganism causes entrapment of the microorganism within the hydrogel's pores. This hydrogel matrix holding, embedded therein, the microorganism is then subjected to a particulating stage where the matrix is chopped/divided into smaller pieces.

Specifically, after hydrogel formation the hydrogel holding the microorganism is subjected to high shearing forces. When referring to "shear forces" it is to be understood as applying mechanical shearing of any type onto the hydrogel, e.g. using a high shear mixer or a pulverizer. When referring to "high shearing" it is to be understood as applying a force of shearing that downsizes the hydrogel into smaller pieces.

In some examples, the high shearing is obtained using a high shear dispenser/mixer. The speed at which the dispenser is operated can be determined based on the desired size reduction, the time of operating the dispenser etc.

In some other examples, the high shearing is obtained using a high shear pulverizer.

The extent of shearing can be defined by the speed of operation of the device used, be it a mixer, a pulverizer or the like.

In some examples, the shearing device is operated at a speed and time that provides the desired size distribution. It has been found by the inventors that the higher the speed, the smaller the size of the particles and longer durations reduces the size distribution (i.e. provides a narrower size distribution). Yet, there should be a balance between time of shearing/pulverization and microorganism viability. Thus, in some embodiments, the shearing device or the pulverization device is operated at a speed of between about 5,000 and 15,000 rpm, at times between about 7,000 rpm and 12,000 rpm, at times about 10,000 rpm. The duration of shearing or specifically pulverization, at the about velocities can range between about 3 to 10 minutes, at times between about 2-5 minutes, at times between about 2-4 minutes or about 3 minutes. In the aforementioned ranges, the use of about denotes deviation from the recited value of ±20%.

The shearing act forms the desired micro-flakes with the microorganisms embedded therein.

It was unexpectedly found that when shearing the hydrogel particles of amorphous flat like shape (referred to as flakes) are formed. Without being bound by theory, it is assumed that this amorphous shape contributes to the association between micro-flakes and the fibrous matter (the fibers), while with spherical particles, chemical covalent binding is typically required. This assumption is also supported by the non-limiting examples provided herein, such as those demonstrated in FIGS. 3A-3L and FIGS. 4A-4B where the irregular, octopus-like shape of the micro-flakes (as compared, for example, to spherical beads) promotes their anchoring into the fibers and exhibiting extensive contact area between the micro-flakes, as comparted to the restricted point of tangency that would be between a spherical body and a fiber.

The flattened shape of the flakes is a unique feature of the present disclosure. In other words, the hydrogel containing micro-flakes do not have a spherical shape and should not be considered as equivalents to spherical hydrogel bodies or beads.

In some examples, the micro-flakes are washed prior to any further use. The washing may be for removal of excess cross-linking agent, or any other excess material. Washing can be with any suitable liquid, preferably with an aqueous solution, such as water, sodium chloride solution or phosphate buffered saline (PBS), more preferably with water.

The micro-flakes can then be used for any purpose. Thus, the present disclosure also provides such micro-flakes per se, as well as the micro-flakes for use as active ingredients in beneficial products.

In some examples, the micro-flakes can be used as active ingredients per se, e.g. in cosmetics and personal care products, as food supplements, and/or as over the counter drugs.

In accordance with another aspect of the present disclosure, the micro-flakes are associated with fibrous matter.

The micro-flakes can be associated to the fibrous matter by various means so as to form a functional fibrous material.

In a method of forming the functional fibrous material, the step of associating the flakes to the fibers may include any one or combination of soaking and/or impregnation of the fibrous matter with a solution comprising the micro-flakes and/or brushing the fibrous material with a solution comprising the micro-flakes and/or spraying the fibrous material with a solution comprising the micro-flakes.

In some cases, the association between the fibers and the micro-flakes can be by printing techniques, where the micro-flakes is combined with the ink and together are printed onto the fibers/fabric.

Excess of liquid can be removed by any one or combination of pressing, drying (e.g. air drying, heat drying), squeezing, wringing and the like.

Excess of liquid is removed until the fibrous material is essentially dry.

In some examples, liquid is removed to an extent that the functional fibrous material includes only residual moisture, this being defined by water content of not more than 10% w/w, at time not more than 8%, at time not more than 5% or even not more than 2% w/w.

The resulting functional fibrous material can then be stored until use. Storing is typically under conditions that prevent contaminations, for example, protected from moisture and opportunist contaminates. In some examples, the storage is in closed containers such as sachets.

The functional fibrous material disclosed herein was exemplified to be effective in treatment of the skin. Yet, the uses of the functional should not be limited to skin treatment and can have various applications where there is a need or an advantage of bringing microorganism into contact with a target to be treated using the fibrous material disclosed herein.

In some examples, the functional fibrous material is used in a method of treatment comprising contacting a target to be treated with a functional fibrous material in a manner that permits transfer of micro-flakes from the fibrous matter or transfer of the microorganism from the micro-flakes, to the target.

In some examples, the functional fibrous material is in a form of a fabric (functional fabric) and the contacting can be any one of smearing the fabric over the target, rubbing the fabric over the target, pressing the fabric over the target or even just holding the fabric on the target for a period of time sufficient for said transfer of flakes and/or microorganism to the target.

In some examples, the target is a skin of a subject. The subject is preferably human but can also be any other animal.

The fibrous material can be used in a method that requires single application or in a continuous, chronic treatment where the target site requires a long term, continuous treatment.

In this context the term "treatment" should be understood to encompass not only treatment of a condition that already exists but also preventative treatment, e.g. to prevent from a condition to develop as well as treatment for maintenance, i.e. to prevent an existing condition from worsening.

The schedule of treatment (e.g. frequency of use) can be determined by the practitioner and will depend, inter alia, on the condition to be treated, the severity of the condition or susceptibility of developing the condition, the age and/or sex of the subject to be treated, or any other consideration will appreciated by those versed in the art.

As used herein, the forms "a", "an" and "the" include singular as well as plural references unless the context clearly dictates otherwise. For example, the term "a gel forming polymer" includes one or more polymers which are capable of forming a hydrogel.

Further, as used herein, the term "comprising" is intended to mean that the composition include the recited material, i.e. microorganism, but not excluding other elements, such as sugars or other additives as well as other active agents. The term "consisting essentially of" is used to define compositions which include the recited elements but exclude other elements that may have an essential significance on the functionality of the fibrous material. "Consisting of" shall thus mean excluding more than trace elements of other elements. Embodiments defined by each of these transition terms are within the scope of this invention.

Further, all numerical values, e.g. when referring the amounts or ranges of the elements constituting the fibrous material, are approximations which are varied (+) or (−) by up to 20%, at times by up to 10% of from the stated values. It is to be understood, even if not always explicitly stated that all numerical designations are preceded by the term "about".

The invention will now be exemplified in the following description of experiments that were carried out in accordance with the invention. It is to be understood that these examples are intended to be in the nature of illustration rather than of limitation. Obviously, many modifications and variations of these examples are possible in light of the above teaching. It is therefore, to be understood that within the scope of the appended claims, the invention may be practiced otherwise, in a myriad of possible ways, than as specifically described hereinbelow.

NON-LIMITING EXAMPLES

Materials and Methods

Probiotic Bacteria Strains

The following examples are exhibited for 3 different bacteria strains:

CoBiotic™, Lapidot Medical—a commercial mixture of probiotic strains with the following composition:

| Strain | % |
| --- | --- |
| Streptococcus thermophilus | 31.5 |
| Lactobacillus rhamnosus | 14 |
| Lactobacillus acidophilus | 13 |
| Lactobacillus casei | 13 |
| Bifidobacterium bifidum | 13 |
| Bifidobacterium longum | 13 |

Lacotbacillus plantarum (LP) ATCC® 8014™ (deposited as: Lactobacillus arabinosus Fred et al.)

Bacillus coagulans (BC) ATCC® 7050™ (deposited as: Bacillus coagulans Hammer)

One loop full of bacterial culture was inoculated into known volume of suitable broth (LP and CoBiotic™ in MRS; BC in Nutrient broth) and incubated at 37° C., 200 rpm overnight in an incubator shaker. The bacteria were grown up to optical density of approximately 1.4, determined using UV-VIS spectrophotometer at 600 nm.

Preparation of Probiotic Bacteria Loaded Micro-Flakes Using a Micro-Particulate Pulverization Method The probiotic bacteria described above were grown in optimal conditions to a concentration of approximately 1.12 bacteria per ml (correlates to optical density of 1.4). Bacteria were centrifuged and the growth medium was discarded. The sediment was re-suspended in 3% sodium alginate solution. Then, this mixture was added to 5 mg/ml solution of $CaCl_2$. The obtained coarse hydrogel was pulverised in the presence of the calcium salt using a high shear dispenser (at 10,000 rpm for over 3 minutes) into essentially homogenous (in size) micronized flakes in which the probiotic bacteria are embedded within cross-linked sodium alginate matrix referred to as micro-flakes. The $CaCl_2$ solution was discarded and the probiotic bacteria loaded micro-flakes (probiotic μFs) were re-suspended in water or in 1.5% trehalose solution.

This unique method disclosed herein enables, inter alia the facile production of micro-flakes (μFs) by means of economic procedure utilizing common industrial equipment (such as a high shear dispersing machine) used for commercial manufacturing of creams, lotions and gels.

Physicochemical Characterization of Probiotic μFs.

Mean Diameter Measurements

Each type of probiotic μFs was prepared at least twice and measured five times using laser diffraction analysis (Mastersizer 3000E, Malvern, UK).

Transmission Electron Microscopy (TEM)

Morphological evaluations of probiotic μFs were carried out using TEM (JEOL, JEM-1400Plus, Japan).

Percent of Bacterial Survival Following Matrix Embedment

A method was developed to evaluate the survival levels of the probiotic bacteria embedded within the various μFs. In this method, disassembly of particulate structures was carried out using the opposite trigger that led to their formation. The hydrogel formed using natural polymers such as alginate and the cross-linker $CaCl_2$ disassemble by means of a chelating agent (EDTA solution) that generates a chelation complex with calcium ions. The probiotic bacteria that were discharged from the µFs were seeded on agar plates and incubated over 48 h at 37° C. The obtained number of the Colony Forming Units (CFU) was compared to the CFU number of non-embedded probiotic bacteria.

Impregnation of the Textile with Probiotic µFs

Non-woven fabrics (NWFs) were treated with aqueous mixture of probiotic µFs by means of impregnation and air-drying of the textiles. In brief, the NWFs were immersed in impregnation bath containing 0.27% probiotic µFs mixture, over 30 seconds. Two types of NWFs were prepared: with or without roller-pressing of the excess fluid absorbed onto the textiles.

Then, the impregnated fabrics were air-dried until dryness. The residual moisture content was determined utilizing the well-known gravimetric method. Morphological evaluations of NWFs treated with probiotic µFs were carried out using SEM (JEOL, JSM 840A, Japan).

Quantification of the Number of Viable BC Bacteria within the NWFs Over Time

The number of the remaining active bacteria following impregnation of the NWFs with probiotic bacteria, was determined using a modified 2,3,5-triphenyltetrazolium chloride (TTC)/formazan assay (Gershenfeld, 1951). In brief, the air-dried NWFs treated with probiotic µFs were incubated on TTC Nutrient broth-agar plates at 37° C. Active BC carry-out enzymatic reduction of TTC to form the exclusively coloured formazan. Then, the formazan was extracted from the fabrics using methanol and trichloroacetic acid solution, followed by centrifugation of the NWFs to remove any residual TTC metabolite. The samples were measured using UV-VIS spectrophotometer at 485 nm while the number of live *Bacillus coagulans* bacteria within probiotic µFs NWFs was determined utilizing a calibration curve.

Efficiency of Probiotic µFs NWFs in Human Skin Ex-Vivo Model

The efficiency of the NWFs treated with probiotic loaded µFs was evaluated on human skin specimens (Fitzpatrick skin type 2 and 3, in terms of response to ultraviolet radiation exposure), obtained with informed consent from healthy women. Skin samples were incubated in Dulbecco's Modified Eagle's medium (DMEM) cell culture media and were pre-treated with 5% of sodium dodecyl sulfate (SDS) solution (Portugal-Cohen, 2011 #522). The ability of the fabrics to protect the skin irritation caused by SDS was determined following incubation of the probiotic µFs NWFs on top of the skin samples over 24 h at 32° C. The Proliferative properties of the human skin specimens was evaluated using 3-(4,5-Dimethylthiazol-2-yl)-2,5-diphenyltetrazolium bromide for (MTT) assay of mitochondrial activity as this tetrazolium salt is reduced by the mitochondria of viable cells, to a metabolite that is detectible using UV spectroscopy at 570 nm.

Results

Characterization of the Various Probiotic µFs by Means of Micro Particulate Pulverization Method The technique presented in this application focuses on the simplicity of production. The coarse hydrogel comprising the probiotic bacteria was pulverized in the presence of the calcium salt. The high sheer force of the dispenser separates the alginate hydrogel into amorphous, multi-shaped flake particles that were immediately cross-linked into matrices embedding/holding the bacteria as their cargo.

The mean sizes of the different probiotic strains embedded within the µFs is presented in Table 1. The results clearly indicate that the sizes of the particles were similar regardless to their type of cargo. Moreover, the size distribution of all the types of the probiotic µFs was relatively narrow and ranged from tens to few hundreds of micro-meters. Furthermore, the addition of the sugar solution to the particulate system did not significantly alter the obtained mean diameters.

TABLE 1

Mean diameters of probiotic µFs containing various bacteria.

| | | Mean diameter, µm (AVE ± SD) | | |
|---|---|---|---|---|
| name | µFs cargo | Dx (10) | Dx (50) | Dx (90) |
| LP | *Lacotbacillus plantarum* | 53.7 ± 2.3 | 134.5 ± 6.5 | 263.8 ± 26.1 |
| CoBiotic ™ | *Streptococcus thermophilus* | 51.3 ± 6.7 | 128.4 ± 12.3 | 244.8 ± 20.8 |
| | *Lactobacillus rhamnosus* | | | |
| | *Lactobacillus acidophilus* | | | |
| | *Lactobacillus casei* | | | |
| | *Bifidobacterium bifidum* | | | |
| | *Bifidobacterium longum* | | | |
| BC | *Bacillus coagulans* | 63.6 ± 9.3 | 124.2 ± 26.6 | 315.3 ± 74.5 |
| BC + trehalose | *Bacillus coagulans* | 72.6 ± 3.6 | 133.8 ± 8 | 239.5 ± 28.6 |

Morphological evaluation of the probiotic µFs comprising different bacteria cargo, was carried out using TEM microscopy. The results presented in FIGS. 1A-1L exhibit for all strains multi-shaped micro-flakes. FIGS. 1A-1C present particles with LP bacteria (cross-linked using 2.5 mg/ml $CaCl_2$), FIGS. 1D-1F present particles with LP bacteria (cross-linked using 5 mg/ml $CaCl_2$); FIGS. 1G-1I present particles with CoBiotic™ bacteria consortium (cross-linked using 5 mg/ml $CaCl_2$); and FIGS. 1J-1L present particles with BC bacteria (cross-linked using 5 mg/ml $CaCl_2$).

Overall, the probiotic bacteria were integrated within the polymeric matrices of the cross-linked alginate hydrogels. Validation of the Survival of the Probiotic Bacteria was Validated Following the Encapsulation Process The survival levels of the probiotic bacteria following the embedment process is summarized in Table 2.

TABLE 2

| | Percent of bacterial survival | | |
|---|---|---|---|
| Name | µFs cargo | % Survival | SD |
| LP µFs | Lacotbacillus plantarum | 30.7 | 11.3 |
| CoBiotic™ µFs | Streptococcus thermophilus | 44.8 | 12.4 |
| | Lactobacillus rhamnosus | | |
| | Lactobacillus acidophilus | | |
| | Lactobacillus casei | | |
| | Bifidobacterium bifidum | | |
| | Bifidobacterium longum | | |
| BC µFs | Bacillus coagulans | 41.5 | 16.4 |
| BC µFs + trehalose | Bacillus coagulans | 43.1 | 13.0 |

As exhibited, the percent of survival of the probiotic bacteria following micro-particulate pulverization method was similar for all the different types of strains. Additionally, the presence of the sugar solution (trehalose) in the particulate system did not significantly modify the obtained viability of the probiotics.

The percent of the BC embedded within the matrix as their cargo was determined using separatory filtration of the bacteria from the microparticles, the results of which are summarized in Table 3.

TABLE 3

| | Percent of BC embedded | | |
|---|---|---|---|
| Name | µFs cargo | % loading of probiotics within µFs | SD |
| LP µFs | Lacotbacillus plantarum | 61.3 | 10.8 |
| CoBiotic™ µFs | Streptococcus thermophilus | 45.5 | 3.7 |
| | Lactobacillus rhamnosus | | |
| | Lactobacillus acidophilus | | |
| | Lactobacillus casei | | |
| | Bifidobacterium bifidum | | |
| | Bifidobacterium longum | | |
| BC µFs | Bacillus coagulans | 62.2 | 2.5 |

The results presented in Table 3 indicate that the multi-strain µFs showed approximately 50% embedment efficiency, while the single LP or BC probiotic strains revealed superior loading values.

Figure 2:
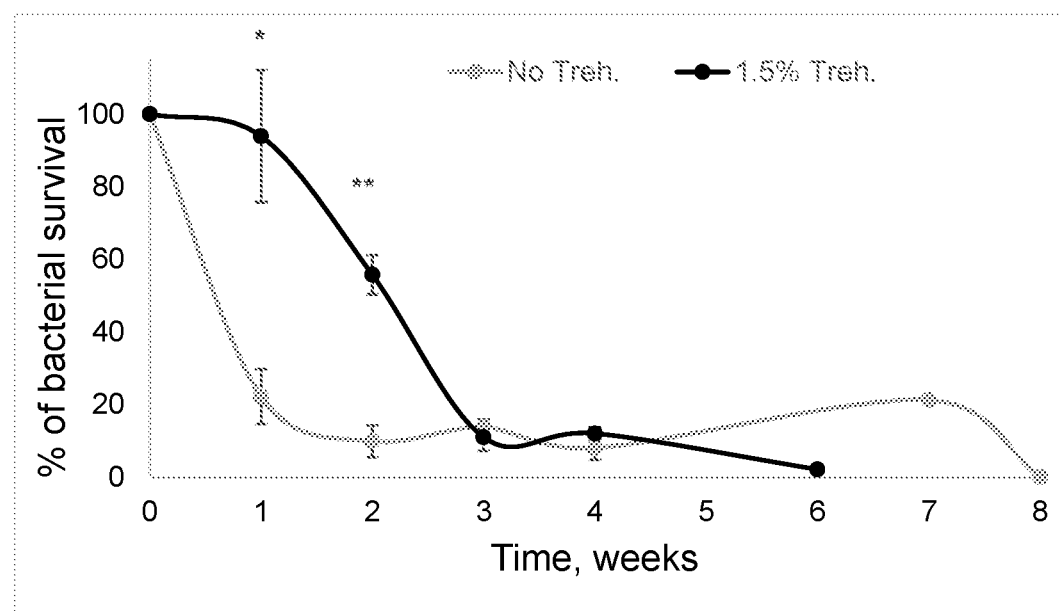

Furthermore, the percent of survival of BC loaded µFs was estimated overtime, as compared to freshly prepared probiotic µFs. The µFs were incubated over time at 25° C. then, seeded on Nutrient broth-agar plates. The results depicted in FIG. 2 suggests that µFs comprised of BC bacteria were stable in the liquid mixture up to 8 days while the optimum window for application on NWFs is limited to less than 1 week (grey curve, 'no Treh'). However, the addition of the sugar solution (1.5% trehalose, black curve) markedly enhanced the bacterial survival by 5.6 and 4.2-fold, at the first and second weeks, respectively. As a result, the 1.5% trehalose solution led to extended and improved optimum window for application on NWFs.

NWFs Treated with Probiotic µFs by Means of Impregnation and Air-Drying

The add-on level (AOL) of the treated fabrics was calculated as the percent of dry BC loaded µFs absorbed into the fabrics from the initial weight of the NWF, and presented in Table 4.

Specifically, Table 4 provides the composition and physical parameters of NWFs treated with probiotic µFs by means of impregnation and air-drying.

TABLE 4

| | Add On Level onto different non-woven fabrics (NWF) | | | | | |
|---|---|---|---|---|---|---|
| | | | % AOL | | Probiotic µFs per area (g/m²) | % w/w |
| NWF | Fabric composition | Fabric weight Gram/m² | No roller-pressing | Roller-pressing | Roller-pressing | Residual moisture |
| A | PET:VIS* 50%:50% | 75 | 6.9 ± 0.5 | 3.3 ± 0.2 | 2.2 ± 0.1 | 4.0 ± 0.3 |
| B | PET:VIS* 80%:20% | 45 | 7.1 ± 1.5 | 4.4 ± 0.3 | 2.1 ± 0.1 | 2.9 ± 0.1 |
| C | Bicomponent PE/PP:COT 85%:15% | 22 | 14.0 ± 1.7 | 11.5 ± 1.9 | 2.1 ± 0.4 | 4.1 ± 0.3 |
| D | PP | 11 | 6.4 ± 1.0 | 6.3 ± 0.5 | 0.8 ± 0.1 | 1.8 ± 0.3 |

Values are AVE ± SD.

N ≥ 6.

PET:VIS—Polyethylene terephthalate:Viscose.

Bicomponent PE/PP:COT—Polyethylene/Polypropylene:Cotton

As evident from Table 4, the heavier NWFs (A and B) exhibited a significant reduction in % AOL following roller-pressing. Therefore, the roller-pressing maybe spared, when treating fabrics that weigh less than 22 g/m² (C and D). Interestingly, the amount of probiotic μFs remained following impregnation (with roller-pressing) per m² was relatively similar for all the NWFs, regardless of their weight and composition, excluding textile D. This textile also exhibited the lowest present (% w/w) of residual moisture.

Morphological Evaluation of NWFs Treated with Probiotic μFs by Means of Impregnation and Air-Drying NWFs impregnated with probiotic (BC) μFs were depicted using SEM and are displayed in FIG. 3.

Figures 3A, 3B, 3C, 3D, 3E, 3F, 3G, 3H, 3I, 3J, 3K, 3L:
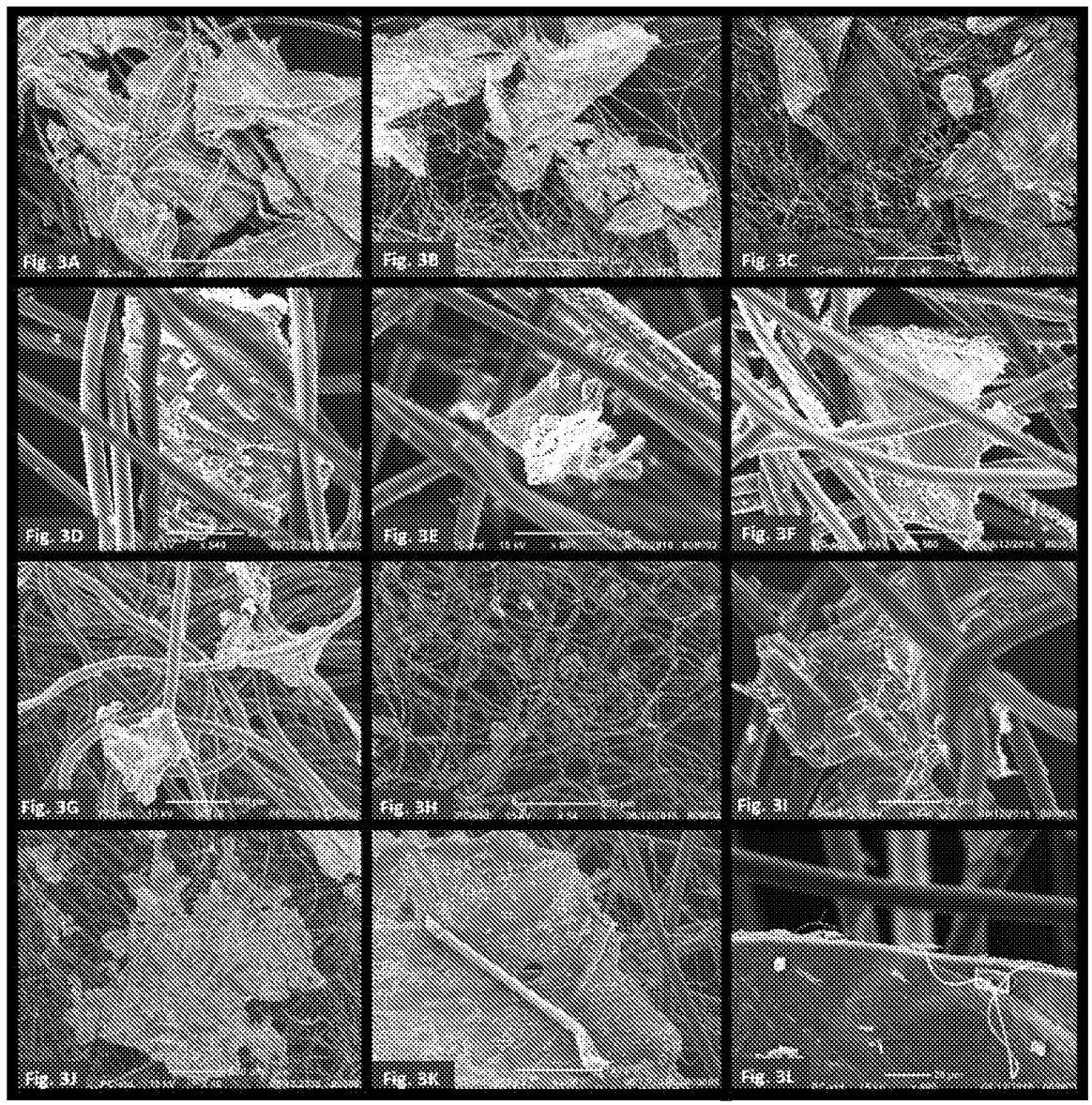

FIGS. 3A-3C provide SEM images of fabric composition of polyethylene terephthalate:viscose (PET:VIS) 50%:50%; FIGS. 1D-1F provide SEM images of fabric composition of terephthalate:viscose (PET:VIS) 80%:20%] and FIGS. 1G-1I provide SEM images of fabric composition of Polyethylene/Polypropylene:cotton (Bicomponent PE/PP:COT) 85%:15% and FIGS. 1J-1L provide SEM images of polypropylene fabric.

Regardless of their weight and composition, all the textile specimens revealed the presence of the microparticulate delivery system incorporated within the fibres of the fabrics. The exceptional amorphous shape of the BC loaded μFs allowed the enveloping of the fibres with polymeric matrixes loaded with probiotic bacteria, as evident from FIGS. 3A-3C, 3G-3J. This phenomenon is attributed to the octopus-like structure of the μFs, having a multi-arms, structure, where the protruding arms are entangled with the fibers of the NWF, while such entanglement is not observed. Further, it is to be noted that the μFs are much thinner in one dimension, as compared to their area dimensions. For example, the thickness of the particle depicted in FIG. 3L was measured to be 3.56±0.65 μm, while the mean diameter these BC loaded μFs is 125 μm (Table 1). This unique coating suggests the superior adhesion of these probiotic μFs, as compared to conventional spherical particles.

Figure 4A:
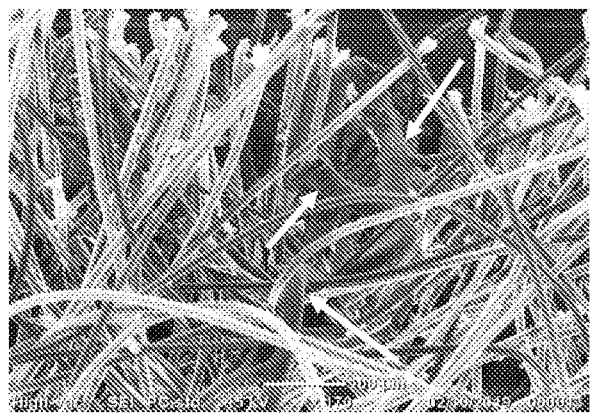
Figure 4B:

The entanglement of the μFs in the fibers of the NWF is also shown in FIGS. 4A-4B (the arrows pointing to the so-called protruding arms). FIGS. 3A-3L and F4-4B thus explicitly exhibit that the irregular shape of the μFs (as compared, for example, to spherical beads) promotes their anchoring into the fibers exhibiting extensive contact area therewith which is inherently superior to the restricted point of tangency between a spherical body and a linear fiber.

Stability Studies Over Time of NWFs Treated with Probiotic μFs

Figure 5A:
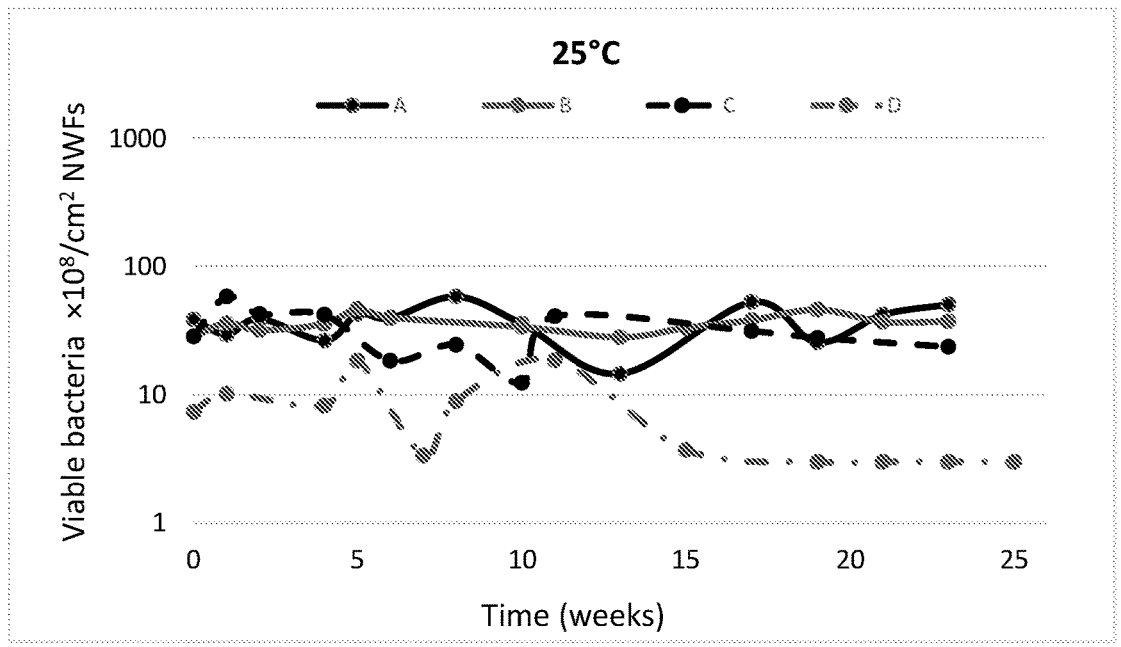
Figure 5B:
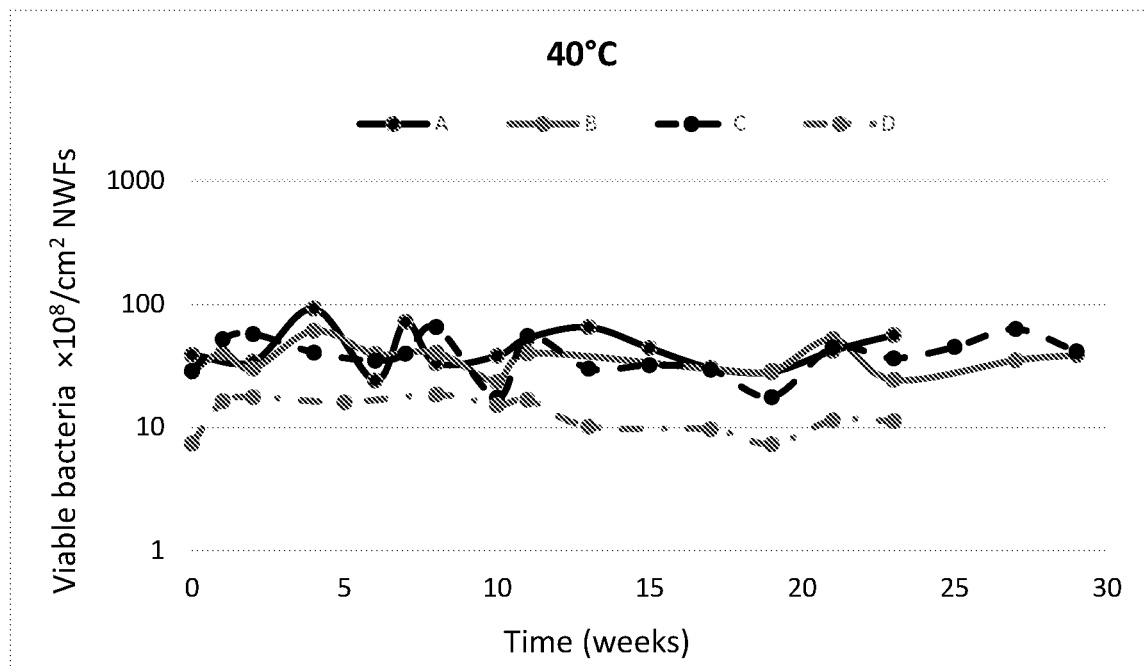
Figure 5C:
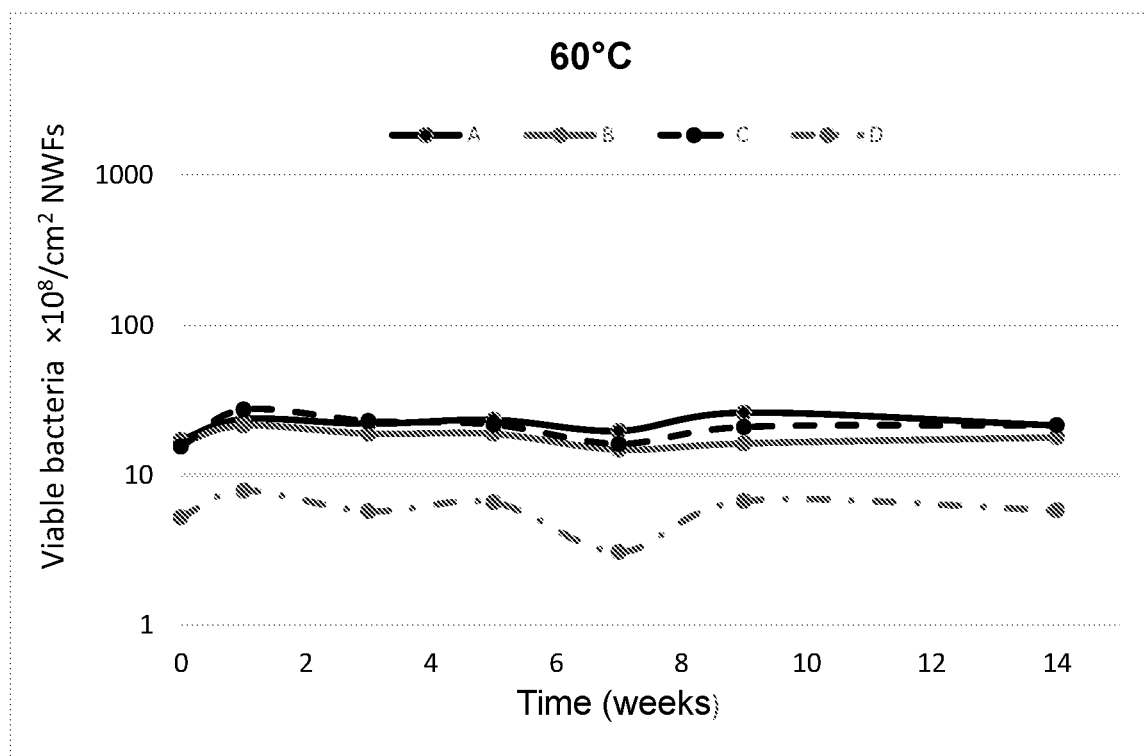

Fresh fabrics treated with BC loaded μFs were stored at either room temperature or elevated temperatures over time. At each time point the number of viable *Bacillus coagulans* bacteria within the NWFs was determined using modified triphenyltetrazolium chloride (TTC)/formazan staining, as in the materials and methods section (under "Quantification of the number of viable BC bacteria within the NWFs over time"). The probiotic μFs NWFs were incubated on TTC Nutrient broth-agar plates. Then, the metabolite formazan was extracted from the bacteria and determined using UV microplate photometer at 485 nm The results presented in FIGS. 5A-5C show the number of viable bacteria per area unit of fabric stored at room temperature (25° C.), 40° C. and 60° C., respectively. The composition and weight of each NWF that was tested (A-D in each of FIGS. 5A-5C) are described in Table 4. Clearly, all the dry fabric samples exhibited noticeable viability corresponding to $10^8$ BC bacteria per square cm NWF. The stability of the dry probiotic fabrics was confirmed over 23 weeks at room temperature and 40° C., while accelerated stability study at 60° C. revealed that the fabrics retained their strength over 14 weeks.

Efficiency of Probiotic μFs NWFs in Human Skin Ex-Vivo Model

Figure 6A:
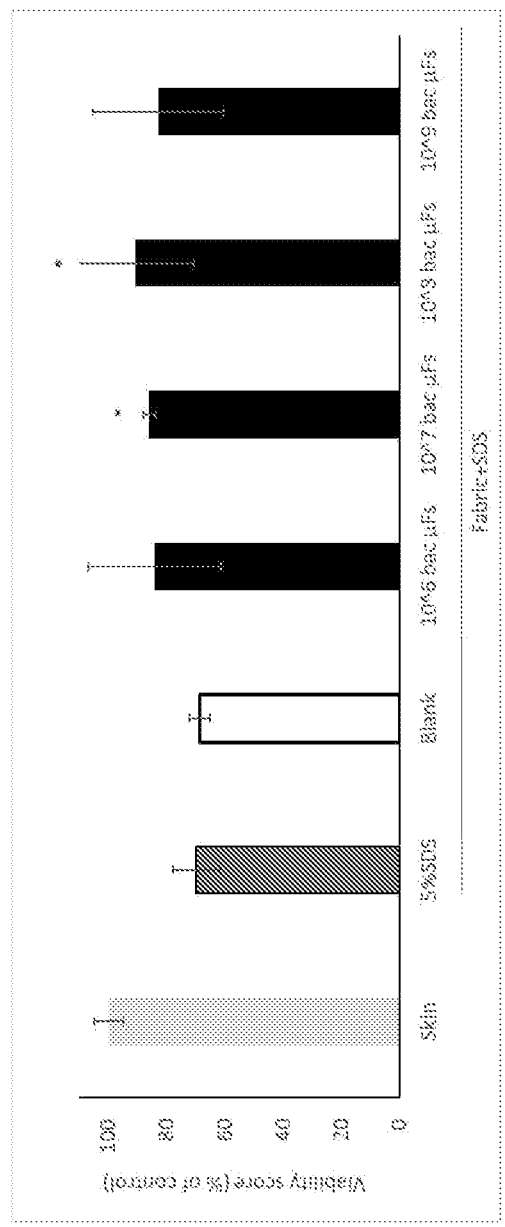
Figure 6B:
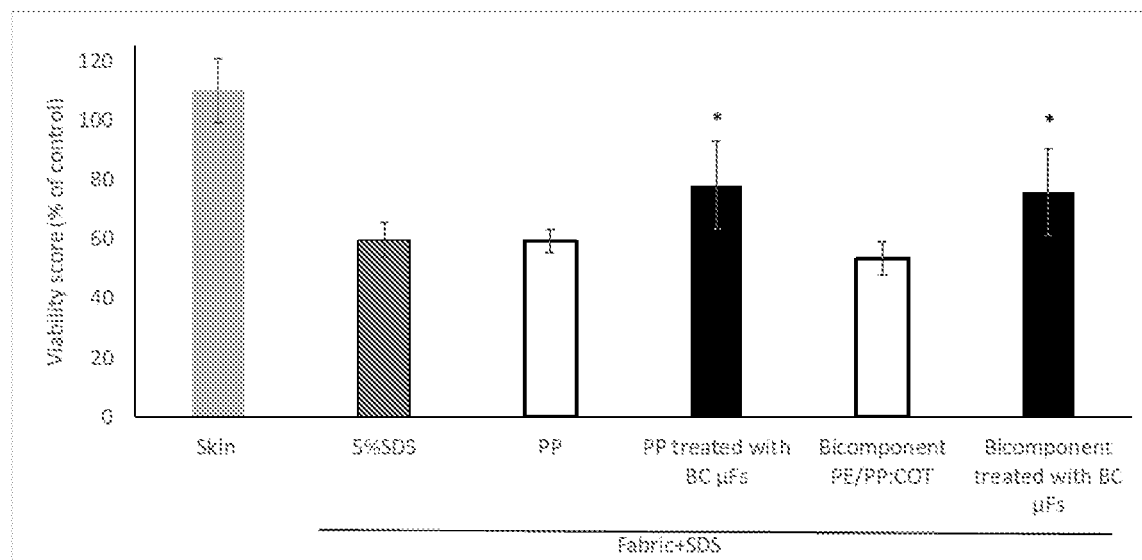

Stimulation of human skin with SDS is well-known to induce pronounced local inflammation and to releases pro-inflammatory mediators. The results presented in FIG. 6A exhibit the marked skin damage caused by the pre-treatment with this chemical irritant (SDS 5%, dark grey bar), relative to undamaged/non-inflamed skin (light grey bar, labeled 'skin'). In addition, skin treated with fabric that did not contain probiotic bacteria showed similar dermal impairment (white bar, labelled 'blank'). In contrast, BC loaded μFs were impregnated and air-dried on NWFs at concentrations of $10^6$-$10^9$ bacteria/cm². Then, probiotic μFs NWFs were placed over irritated human skin specimens and the coetaneous proliferative properties were measured by means of mitochondrial assay (the four black bars). A significant recovery was observed in skin viability following topical treatment with NWFs treated with probiotic μFs at concentrations of $10^7$-$10^8$ bacteria/cm² (the two middle black bars). These results were consistent, as demonstrated in FIG. 6B, when two different fabrics: Bicomponent PE/PP: COT (C, See Table 4) and PP (D, See Table 4) were treated with $10^8$ BC bacteria loaded μFs/cm²

These results stress-out the marked potential of this invention described by the present application to enhance skin regeneration and improve dermal inflammation disorders.

Degradation of Probiotic Loaded Micro-Flakes

The unique degradation performance of probiotic loaded micro-flakes in the presence of electrolytes was also exhibited.

Specifically, disintegration over time of the μFs studies were carried out upon dilution with mineral salt solution (phosphate buffered saline), as compared to dilution with distilled water. The analysis was based on 4 samples (N=1-4).

In brief, BC loaded μFs were incubated over time with phosphate buffered saline (PBS) or distilled water (DW). The degradation of the microbial flakes was evaluated from mean size measurements at certain time intervals, as compared to the initial mean size of the μFs.

Figure 7A:
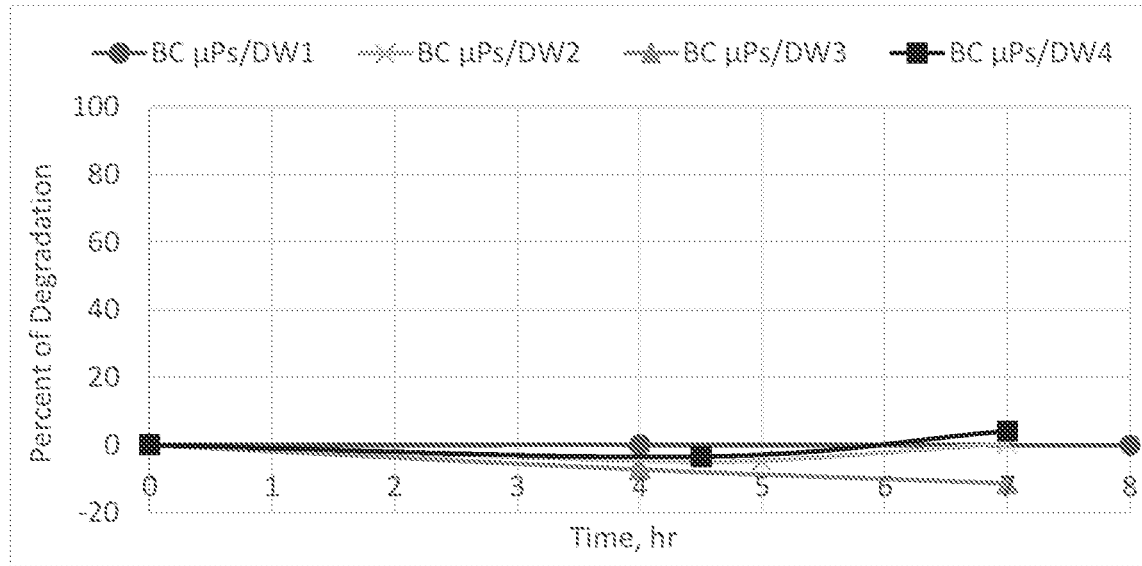
Figure 7B:
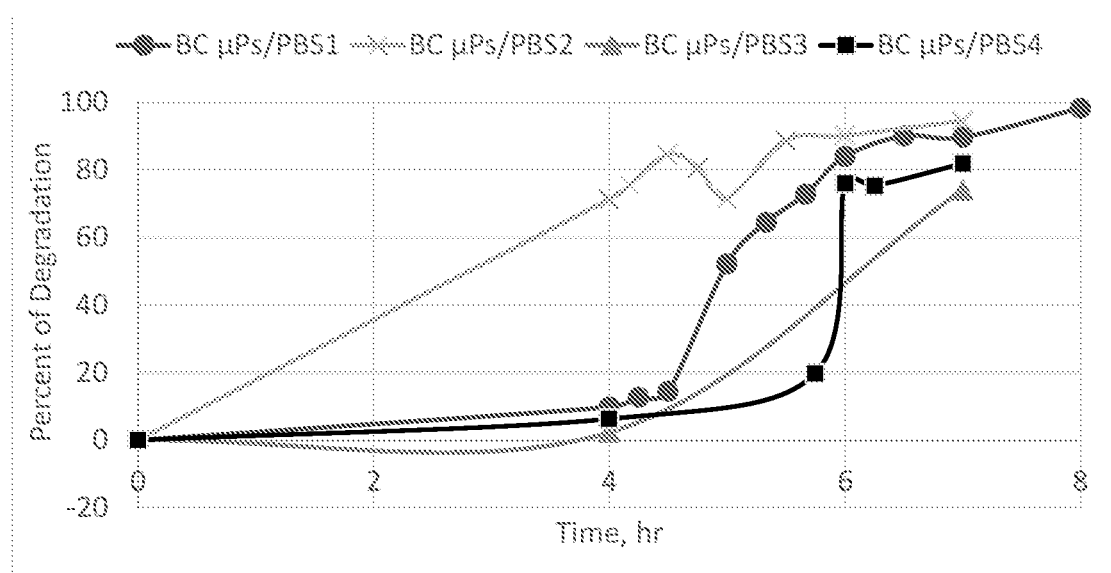

The microbial μFs (BC μFs) were incubated with either the mineral salt solution or DW and the mean sizes of the flakes was measured at different time points. FIG. 7A and FIG. 7B clearly show that the microbial μF disintegrate in time in the presence of electrolytes while in an electrolyte free environment, there is no degradation or disintegration of the flakes.

Specifically, the degradation of the microbial flakes commenced following 4-5.75 hours in the presence of electrolytes. The probiotic μFs achieved nearly full disintegration after 7 hours of incubation with PBS, reaching to 84.8%±9.1 of degradation. In fact, at this time point the mean diameters of the microbial flakes were 1.6±0.7 μm, indicating that the bacteria were completely released since the matrices comprising the particles degraded (FIG. 7A).

In contrast, microbial flakes that were incubated in the absence of mineral salts did not disintegrated for at least 7 hours. The flakes did not decrease in mean size over time and maintained their original dimensions and unique amorphous shape, suggesting that the BC bacteria were not released from the polymeric matrices (FIG. 7B).

These findings stress out the unique release properties of the probiotic bacteria, that can be triggered by the presence of mineral salts.

This performance is emphasizing the sensor-actuator probiotic activity properties of nonwoven fabrics elicited on the skin upon contact with cutaneous secreted electrolytes (namely upon contact with perspiration).

The invention claimed is:

1. A functional fibrous material, comprising:
   a plurality of fibers;
   a plurality of micro-flakes;
      wherein each micro-flake of the plurality of micro-flakes is composed of a hydrogel;
         wherein the hydrogel is crosslinked;
         wherein at least one microorganism is embedded in the hydrogel;
      wherein each micro-flake of the plurality of micro-flakes has at least one sheet-like protruding edge;
      wherein a plurality of sheet-like protruding edges of the plurality of micro-flakes are, at least partially, wrapped around the plurality of fibers so that the plurality of micro-flakes are entangled with the plurality of fibers; and
   wherein, when in a presence of electrolytes, the at least one microorganism is released from the functional fibrous material.

2. The functional fibrous material of claim 1, wherein the plurality of sheet-like protruding edges of the plurality of micro-flakes are non-covalently entangled with the plurality of fibers.

3. The functional fibrous material of claim 1, wherein the at least one sheet-like protruding edge of each micro-flake of the plurality of micro-flakes has an irregular contour.

4. The functional fibrous material of claim 1, wherein at least 50% of the plurality of micro-flakes have a mean diameter within a range of 30 µm to 700 µm.

5. The functional fibrous material of claim 1, wherein each micro-flake of the plurality of micro-flakes comprises water content of between 1% w/w and 10% w/w.

6. The functional fibrous material of claim 1, wherein the hydrogel comprises a water absorbing gel forming polymer.

7. The functional fibrous material of claim 1, wherein the at least one microorganism is one of a bacterium, yeast, archaea, fungi, or algae.

8. The functional fibrous material of claim 7, wherein the at least one microorganism is a live microorganism.

9. The functional fibrous material of claim 1, wherein the plurality of fibers are arranged into a non-woven fabric.

10. The functional fibrous material of claim 1, wherein the plurality of fibers are at a density of at least 0.1 g fibers for each area unit (1 m$^2$) of the functional fibrous material.

11. The functional fibrous material of claim 1, wherein the plurality of micro-flakes are at a weight percent with respect to the plurality of fibers, of at least 0.5% w/w, as determined when the plurality of micro-flakes are in a dry form.

12. A method of forming a hydrogel, comprising:
   suspending at least one microorganism in a solution comprising gel forming material to form a microbial mixture;
   adding to the microbial mixture a sufficient amount of a crosslinking agent to cause crosslinking of the gel forming material with the at least one microorganism to form a hydrogel having the at least one microorganism embedded therein; and
   subjecting the hydrogel to a high shear force to form a plurality of micro-flakes, each having at least one sheet-like protruding edge of an irregular shape.

13. The method of claim 12, wherein the step of subjecting the hydrogel to the high shear force comprises pulverizing the hydrogel.

14. The method of claim 12, wherein the step of subjecting the hydrogel to the high shear force cause a mechanical breakdown of the hydrogel into the plurality of micro-flakes.

15. The method of claim 12, wherein the step of subjecting the hydrogel to the high shear force is at a sufficient condition that creates the plurality of micro-flakes that are essentially homogenous in a mean size.

16. The method of claim 12, further comprising:
   impregnating a plurality of fibers with a solution carrying the plurality of micro-flakes to form a resulting mixture; and
   removing liquid from the resulting mixture to obtain a functional fibrous material with a residual moisture defined by water content of not more than 10% w/w.

17. A method of treatment, the method comprising:
   contacting a skin surface to be treated with a functional fibrous material for a sufficient duration so as to result in at least one of:
      a treatment of any one of acne, seborrhea, atopic dermatitis, ammonia dermatitis, psoriasis, or rosacea,
      a treatment of a skin burn,
      a treatment of a skin infection,
      a wound healing,
      a wound care,
      a cosmetic use, or
      any combination thereof;
   wherein the functional fibrous material comprises:
      a plurality of fibers and
      a plurality of micro-flakes;
      wherein each micro-flake of the plurality of micro-flakes is composed of a hydrogel;
      wherein at least one microorganism is embedded in the hydrogel; and
      wherein each micro-flake of the plurality of micro-flakes has at least one sheet-like protruding edge; and
      wherein a plurality of sheet-like protruding edges of the plurality of micro-flakes are, at least partially, wrapped around the plurality of fibers so that the plurality of micro-flakes are entangled with the plurality of fibers.

18. The method of claim 17, wherein the contacting comprises at least one of:
   rubbing the functional fibrous material over the skin surface,
   scrubbing the functional fibrous material over the skin surface,
   pressing the functional fibrous material onto the skin surface, or
   using the functional fibrous material as a dermatological mask.

19. The method of claim 17, wherein the at least one microorganism is selected from the group consisting of probiotics, fungi, archaea and algae.

* * * * *